US012430155B2

(12) United States Patent
Kim et al.

(10) Patent No.: US 12,430,155 B2
(45) Date of Patent: Sep. 30, 2025

(54) DISPLAY APPARATUS AND CONTROLLING METHOD THEREOF

(71) Applicant: SAMSUNG ELECTRONICS CO., LTD., Suwon-si (KR)

(72) Inventors: Yang-Soo Kim, Yongin-si (KR); Suraj Singh Tanwar, Noida (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/347,391

(22) Filed: Jul. 5, 2023

(65) Prior Publication Data

US 2023/0350707 A1 Nov. 2, 2023

Related U.S. Application Data

(63) Continuation of application No. 17/010,614, filed on Sep. 2, 2020, now Pat. No. 11,726,806, which is a (Continued)

(30) Foreign Application Priority Data

Jul. 19, 2017 (KR) ........................ 10-2017-0091494

(51) Int. Cl.
*G06F 3/048* (2013.01)
*G06F 3/0481* (2022.01)
(Continued)

(52) U.S. Cl.
CPC ............ *G06F 9/454* (2018.02); *G06F 3/0481* (2013.01); *G06F 3/0484* (2013.01); *G06F 3/167* (2013.01); *G06F 40/263* (2020.01)

(58) Field of Classification Search
None
See application file for complete search history.

(56) References Cited

U.S. PATENT DOCUMENTS 8,560,322 B2 10/2013 Lee et al.
8,635,061 B2 1/2014 Li et al.
(Continued)

FOREIGN PATENT DOCUMENTS

CN 101729656 A 6/2010
CN 102402584 A 4/2012
(Continued)

OTHER PUBLICATIONS

Communication issued Nov. 2, 2023 by the Indian Patent Office in Indian Patent Application No. 201814017689.
(Continued)

*Primary Examiner* — Hua Lu
(74) *Attorney, Agent, or Firm* — Sughrue Mion, PLLC

(57) ABSTRACT

A display apparatus is provided. The display apparatus according to an embodiment includes a display, and a processor configured to control the display to display a UI screen including a plurality of text objects, control the display to display a text object in a different language from a preset language among the plurality of text objects, along with a preset number, and in response to a recognition result of a voice uttered by a user including the displayed number, perform an operation relating to a text object corresponding to the displayed number.

16 Claims, 11 Drawing Sheets

Related U.S. Application Data continuation of application No. 15/974,133, filed on May 8, 2018, now Pat. No. 10,802,851.

(60) Provisional application No. 62/505,363, filed on May 12, 2017.

(51) Int. Cl.
*G06F 3/0484* (2022.01)
*G06F 3/16* (2006.01)
*G06F 9/451* (2018.01)
*G06F 40/263* (2020.01)

(56) References Cited

U.S. PATENT DOCUMENTS

| | | | |
|---|---|---|---|
| 9,002,699 B2 | 4/2015 | Qin | |
| 9,026,448 B2 | 5/2015 | Koivuniemi et al. | |
| 9,129,011 B2 | 9/2015 | Yang | |
| 9,183,832 B2 | 11/2015 | Bak et al. | |
| 9,355,639 B2 | 5/2016 | Otani | |
| 9,886,958 B2 * | 2/2018 | Celikyilmaz | G10L 17/26 |
| 10,339,823 B2 | 7/2019 | Bak | |
| 10,922,990 B2 | 2/2021 | Bak | |
| 2006/0106614 A1 * | 5/2006 | Mowatt | G10L 15/18 |
| | | | 704/E15.044 |
| 2006/0271352 A1 | 11/2006 | Nikitin et al. | |
| 2010/0105364 A1 * | 4/2010 | Yang | G06F 3/167 |
| | | | 704/235 |
| 2012/0095748 A1 * | 4/2012 | Li | G06F 40/263 |
| | | | 704/8 |
| 2012/0313849 A1 * | 12/2012 | Bak | G06F 3/167 |
| | | | 345/156 |
| 2013/0033644 A1 * | 2/2013 | Kim | H04N 21/4821 |
| | | | 348/E5.097 |
| 2013/0124187 A1 * | 5/2013 | Qin | G06F 40/263 |
| | | | 704/8 |
| 2014/0052450 A1 * | 2/2014 | Cheong | H04N 21/42203 |
| | | | 704/E21.001 |
| 2014/0195230 A1 * | 7/2014 | Han | G10L 15/22 |
| | | | 704/235 |
| 2014/0196087 A1 * | 7/2014 | Park | H04N 21/472 |
| | | | 725/37 |
| 2014/0223273 A1 * | 8/2014 | Chung | G06F 40/134 |
| | | | 715/205 |
| 2014/0358542 A1 * | 12/2014 | Otani | G10L 15/22 |
| | | | 704/246 |
| 2015/0066473 A1 * | 3/2015 | Jeong | G06F 9/454 |
| | | | 704/2 |
| 2015/0161099 A1 | 6/2015 | Lee et al. | |
| 2015/0371629 A9 | 12/2015 | Julia et al. | |
| 2016/0133146 A1 * | 5/2016 | Bak | G10L 15/30 |
| | | | 434/322 |
| 2016/0202872 A1 * | 7/2016 | Jang | G06F 3/033 |
| | | | 715/728 |
| 2019/0279523 A1 | 9/2019 | Bak | |
| 2021/0065572 A1 | 3/2021 | Bak | |

FOREIGN PATENT DOCUMENTS

| | | |
|---|---|---|
| CN | 102833582 A | 12/2012 |
| CN | 102866824 A | 1/2013 |
| CN | 103888799 A | 6/2014 |
| CN | 104423582 A | 3/2015 |
| CN | 104904227 A | 9/2015 |
| CN | 105592343 A | 5/2016 |
| CN | 106250474 A | 12/2016 |
| EP | 2 533 242 A1 | 12/2012 |
| JP | 2014-235356 A | 12/2014 |
| JP | 5774035 B2 | 7/2015 |
| KR | 1020130018464 A | 2/2013 |
| KR | 10-2014-0092873 A | 7/2014 |
| KR | 10-2014-0100315 A | 8/2014 |
| KR | 10-2015-0067489 A | 6/2015 |
| KR | 10-1545582 B1 | 8/2015 |
| KR | 10-2016-0148173 A | 12/2016 |
| WO | 99/48088 A1 | 9/1999 |
| WO | 2012/050743 A2 | 4/2012 |

OTHER PUBLICATIONS

Communication dated May 31, 2023 by the China National Intellectual Property Administration in Chinese Application No. 201810467513.1.
Communication dated Aug. 30, 2022 issued by the Chinese Patent Office in Chinese Patent Application No. 201810467513.1.
Communication dated Apr. 11, 2022 issued by the Korean Patent Office in Korean Application No. 10- 2017-0091494.
Communication issued Oct. 8, 2021 by the European Patent Office in counterpart European Patent Application No. 18169943.0.
Communication issued Oct. 25, 2021 by the Korean Intellectual Property Office in counterpart Korean Patent Application No. 10-2017-0091494.
Communication issued Nov. 11, 2021 by the European Patent Office in counterpart European Patent Application No. 18169943.0.
Communication dated Mar. 29, 2021, issued by the European Patent Office in counterpart European Application No. 18169943.0.
Communication dated Nov. 25, 2020 issued by the Indian Patent Office in counterpart Indian Application No. 201814017689.
Communication issued Oct. 4, 2018 by the European Patent Office in counterpart European Patent Application No. 18169943.0.
Communication dated Aug. 19, 2020, from the European Patent Office in counterpart European Application No. 18169943.0.
Communication dated Jun. 29, 2025, issued by the China National Intellectual Property Administration in Chinese Patent Application No. 202310065267.8.

* cited by examiner

DISPLAY APPARATUS AND CONTROLLING METHOD THEREOF

CROSS-REFERENCE TO RELATED APPLICATIONS

This application is a Continuation of U.S. application Ser. No. 17/010,614 filed Sep. 2, 2020, which is a Continuation of U.S. application Ser. No. 15/974,133 filed May 8, 2018, now U.S. Pat. No. 10,802,851, issued Oct. 13, 2020, which claims the benefit of U.S. Provisional Application No. 62/505,363 filed on May 12, 2017, in the United States Patent and Trademark Office, and priority from Korean Patent Application No. 10-2017-0091494, filed on Jul. 19, 2017, in the Korean Intellectual Property Office, the disclosures of which are incorporated herein by reference in their entireties.

BACKGROUND

1. Field

Devices and methods consistent with embodiments of the present application relate to a display apparatus and a method for controlling the same, and more particularly, to a display apparatus that supports voice recognition of contents in various languages and a method for controlling the same.

2. Description of the Related Art

With the development of electronic technology, various types of display apparatuses have been developed. Particularly, various electronic apparatuses such as televisions, mobile phones, personal computers, notebook, laptop, and tablet computers, and smartphones and personal digital assistants have been widely adopted.

Recently, voice recognition technology has been developed to more conveniently and intuitively control a display apparatus.

Conventionally, a display apparatus controlled by user voice performs voice recognition by using a voice recognition engine. However, the voice recognition engine varies depending on the language in use, and thus a voice recognition engine for use may be determined in advance. Typically, a system language of the display apparatus is determined as a language to be used for voice recognition.

However, assuming that English is used in a hyperlink text displayed on the display apparatus and Korean is used as a system language of the display apparatus, even if a user utters a voice corresponding to the hyperlink text, the voice is changed into Korean text via a Korean voice recognition engine. Thus, the problem lies in that the hyperlink text cannot be selected.

Thus, there is limitation on controlling a display apparatus by voice when a system language is different from the language on the display apparatus.

SUMMARY

Aspects of the exemplary embodiments relate to a display apparatus providing voice recognition control for contents in various languages and a controlling method for the same.

According to an aspect of an exemplary embodiment, there is provided a display apparatus including a display, and a processor configured to control the display to display user interface comprising a plurality of text objects, control the display to display a text object among the plurality of text objects in a language different from a preset language along with a preset symbol, and in response to a recognition result of a voice uttered by a user including the symbol, perform an operation relating to a text object corresponding to the symbol.

The processor is further configured to set a language which is set in a setting menu of the display apparatus as the preset language or set a most used language for the plurality of text object as the preset language.

The user interface may be a webpage, and the processor may be further configured to set a language corresponding to language information of the webpage as the preset language.

The processor may be further configured to determine a text object having at least two languages among the plurality of text objects, as a text object in a language different from the preset language based on a ratio of the at least two languages.

The processor may be further configured to control the display to display the symbol adjacent to a text object corresponding to the symbol.

The display apparatus may further include a communicator, and the processor may be further configured to control the display to display the symbol while a signal corresponding to selection of a specific button of an external apparatus is received by the communicator.

The external apparatus may include a microphone, the communicator may be configured to receive a voice signal corresponding to a voice input through the microphone of the external apparatus, and the processor may be further configured to, in response to a recognition result of the received voice signal including the symbol, perform an operation relating to a text object corresponding to the symbol.

The processor may be further configured to, in response to a recognition result of the received voice signal including a text corresponding to one of the plurality of text objects, perform an operation relating to the text object.

The operation relating to the text object may include an operation of displaying a webpage having an URL address corresponding to the text object or an operation of executing an application program corresponding to the text object.

The plurality of text objects may be included in an execution screen of a first application, and the processor may be further configured to, in response to determining that an object corresponding to a recognition result of a voice uttered by a user is not included in the execution screen of the first application while an execution screen of the first application is displayed, execute a second application different from the first application and perform an operation corresponding to the voice recognition result.

The second application may provide a search result of a search word, and the processor may be further configured to, in response to determining that the object corresponding to the recognition result of the voice uttered by the user is not included in an execution screen of the first application while the execution screen of the first application is displayed, execute the second application and provide a search result using a text corresponding to the voice recognition result as a search word.

The display apparatus may further include a communicator configured to perform communication with a server performing voice recognition of a plurality of different languages, and the processor may be further configured to control the communicator to provide a voice signal corresponding to a voice uttered by the user and information on the preset language to the server, and in response to a voice recognition result received from the server including the displayed number, perform an operation relating to a text object corresponding to the symbol.

The processor may be further configured to, in response to the voice recognition result received from the server including a text corresponding to one of the plurality of text objects, perform an operation relating to the text object.

According to an aspect of an exemplary embodiment, there is provided a controlling method for a display apparatus, the method including displaying a user interface comprising a plurality of text objects, displaying a text object in a language different from a preset language along with a symbol; and in response to a recognition result of a voice uttered by a user including the symbol, performing an operation relating to a text object corresponding to the symbol.

The method may further include setting a language which is set in a setting menu of the display apparatus as the preset language or setting a most used language for the plurality of text object as the preset language.

The plurality of text objects are included in a webpage and the controlling method for the display apparatus may further include setting a language corresponding to language information of the webpage as the preset language.

The method may further include determining a text object in at least two languages among the plurality of text objects, as a text object in a language different from the preset language based on a ratio of the at least two languages.

The displaying of the text object along with the displayed number may include displaying the symbol adjacent to a text object corresponding to the symbol.

The displaying of the text object along with the displayed number may include displaying the symbol while a signal corresponding to selection of a specific button of an external apparatus is received from the external apparatus.

The performing of the operation relating to the text object may include displaying a webpage having a URL address corresponding to the text object and executing an application program corresponding to the text object.

The plurality of text objects may be included in an execution screen of a first application, and the method may further include, in response to determining that an object corresponding to a recognition result of a voice uttered by a user not being included in the execution screen of the first application while the execution screen of the first application is displayed, executing a second application which is different from the first application and perform an operation corresponding to the voice recognition result.

The method may further include providing information on a voice signal corresponding to the voice uttered by the user and the preset language to a server configured to perform voice recognition of a plurality of different languages, and performing an operation relating to the text object may include, in response to the voice recognition result received through the server including the displayed number, performing an operation relating to a text object corresponding to the displayed number.

According to an aspect of an exemplary embodiment, there is provided a non-transitory computer readable recording medium having embodied thereon a program for executing a method of controlling a display apparatus, the method may include controlling the display apparatus to display a user interface comprising a plurality of text objects and display a text object in a language different from a preset language along with a preset number, and in response to a recognition result of a voice uttered by a user including the symbol, performing an operation relating to a text object corresponding to the symbol.

DETAILED DESCRIPTION OF EXEMPLARY EMBODIMENTS

Before describing the present disclosure in detail, a method of describing the present specification and drawings will be described.

All the terms used in this specification including technical and scientific terms have the same meanings as would be generally understood by those skilled in the related art. However, these terms may vary depending on the intentions of the person skilled in the art, legal or technical interpretation, and the emergence of new technologies. In addition, some terms may be arbitrarily selected. These terms may be construed in the meaning defined herein and, unless otherwise specified, may be construed on the basis of the entire contents of this specification and common technical knowledge in the art.

The terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

The terms used in the application are merely used to describe particular exemplary embodiments, and are not intended to be limiting. Singular forms are intended to include the plural forms as well, unless the context clearly indicates otherwise. It will be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

In an exemplary embodiment, 'a module', 'a unit', or 'a part' configured to perform at least one function or operation, and may be realized as hardware, such as a processor or integrated circuit, software that is stored in memory, loaded from memory, and executed by a processor reading from the memory, or a combination thereof. In addition, a plurality of 'modules', a plurality of 'units', or a plurality of 'parts' may be integrated into at least one module or chip and may be realized as at least one processor except for 'modules', 'units' or 'parts' that should be realized in a specific hardware.

Hereinafter, the exemplary embodiments of the present disclosure will be described in detail with reference to the accompanying drawings.

Figure 1:
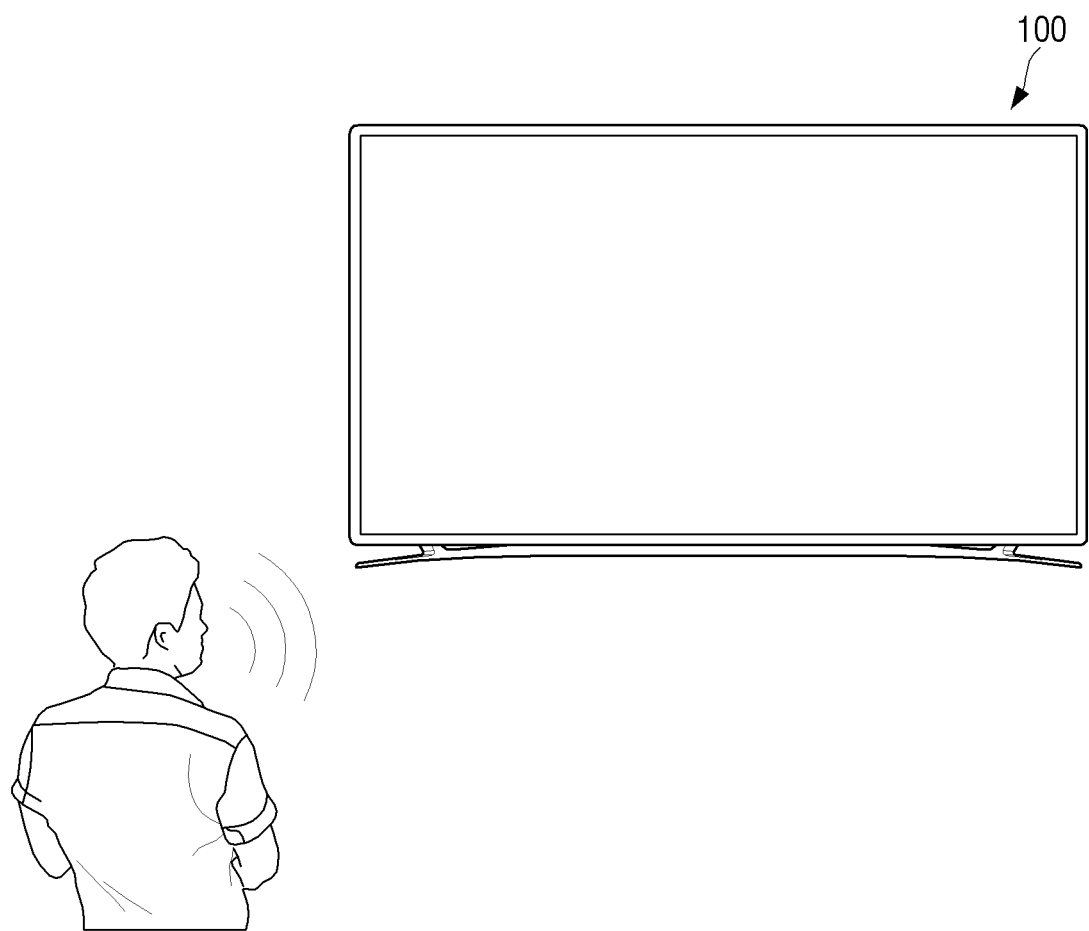
FIG. 1 and FIG. 2 are views illustrating a method for inputting a voice command to a display apparatus according to exemplary embodiments of the present disclosure.

FIG. 1 is a view illustrating a display apparatus controlled by voice recognition according to an exemplary embodiment of the present disclosure.

Referring to FIG. 1, a display apparatus 100 may be a television (TV) as shown in FIG. 1, but is not limited thereto. The display apparatus 100 may be embodied as any kind of device capable of displaying information and images, such as a smartphone, a desktop PC, a notebook or tablet, a smart watch or other user peripheral, a navigation device, a refrigerator or household appliance, or the like.

The display apparatus 100 may perform an operation or execute a command based on a recognition result of a voice uttered by a user. For example, when the user says "change to channel No. 7", the display apparatus 100 may tune to channel No. 7 and display a program on channel No. 7, and when the user says "turn off the power", the power of the display apparatus 100 may be turned off.

Thus, it may be perceived by a user that the display apparatus 100 may operate as if the display apparatus communicates with the user. For example, when the user asks "what is the name of the broadcasting program?", the display apparatus may output a response message "the name of the broadcasting program is xxx" by voice or in text. When the user asks by voice "how is the weather today?", the display apparatus may output a message "please tell me where you want to know the temperature" by voice or in text, and in response to that, when the user answers "Seoul", the display apparatus 100 may output a message "the temperature of Seoul is xxx" by voice or in text.

As shown in FIG. 1, the display apparatus 100 may receive user voice through a microphone connected to the display apparatus 100 or attached to the display apparatus 100. The display apparatus 100 may receive a voice signal corresponding to voice received through a microphone of an external apparatus (such as a PC or smartphone) from the external apparatus. The detailed description thereof will be made with reference to FIG. 2.

Figure 2:
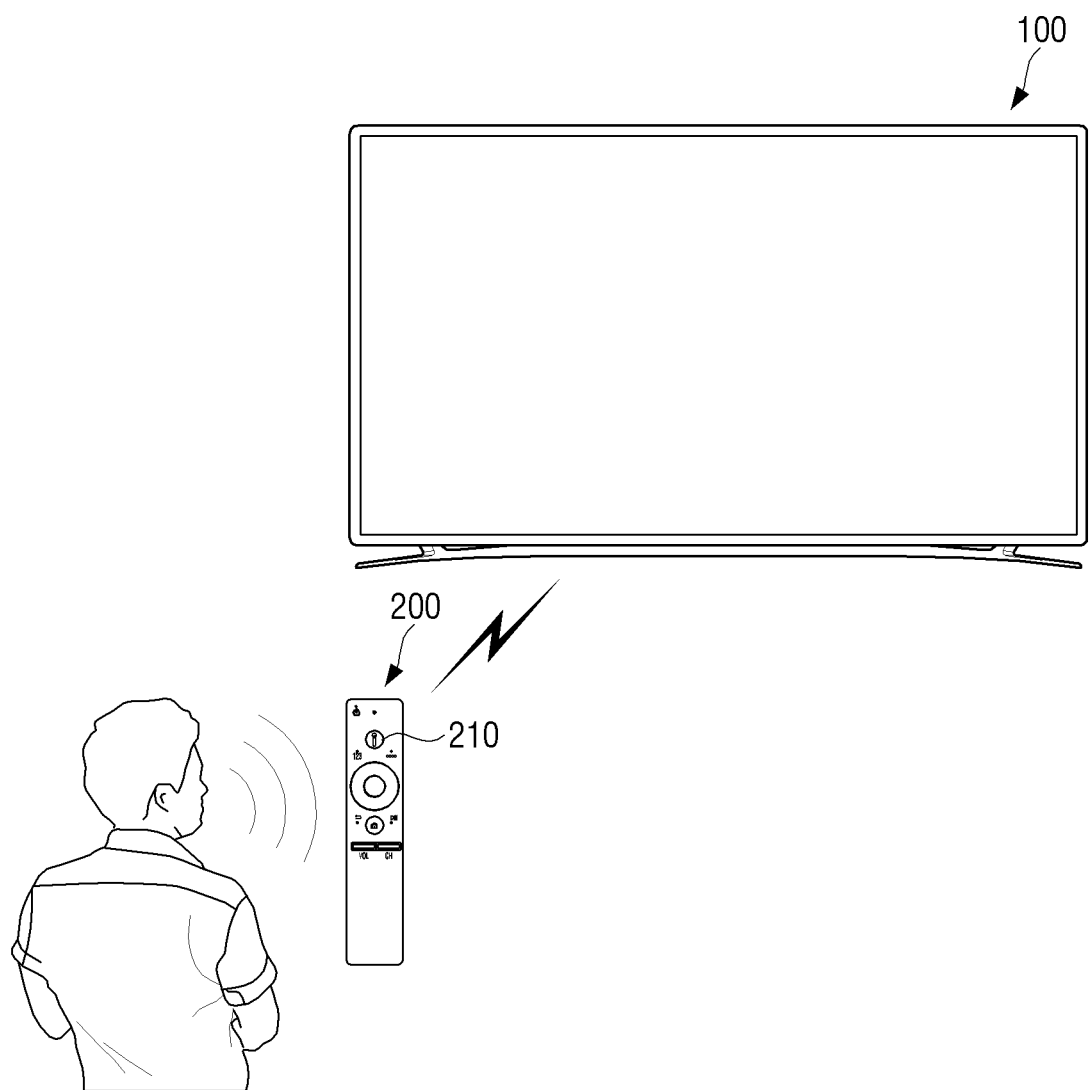

FIG. 2 is a view illustrating a display system according to an exemplary embodiment of the present disclosure.

Referring to FIG. 2, a display system may include a display apparatus 100 and an external apparatus 200.

As described in FIG. 1, the display apparatus 100 may operate according to the voice recognition result.

FIG. 2 shows an example where the external apparatus 200 is embodied as a remote controller, but the external apparatus 200 may be embodied as an electronic apparatus such as a smartphone, a tablet PC, a smart watch, etc.

The external apparatus 200 may include a microphone and transmit signals corresponding to voice input through the microphone to the display apparatus 100. The signals may correspond to the user's voice or text corresponding to the user's voice that is converted to text by the external apparatus 200. For example, the external apparatus 200 may transmit the voice signal to the display apparatus 100 using a wireless communication method such as infrared (IR), RF, Bluetooth, WiFi, or the like.

The external apparatus 200 may be enabled when a predetermined event occurs, thereby saving power. For example, while a microphone button 210 of the external apparatus 200 is pressed, the microphone may be enabled, and when the microphone button 210 is released, the microphone may be disabled. In other words, the microphone may receive voice only when the microphone button 210 is pressed.

An external server may perform recognition of a voice received through the microphone of the display apparatus 100 or the microphone of the external apparatus 200.

Figure 3:
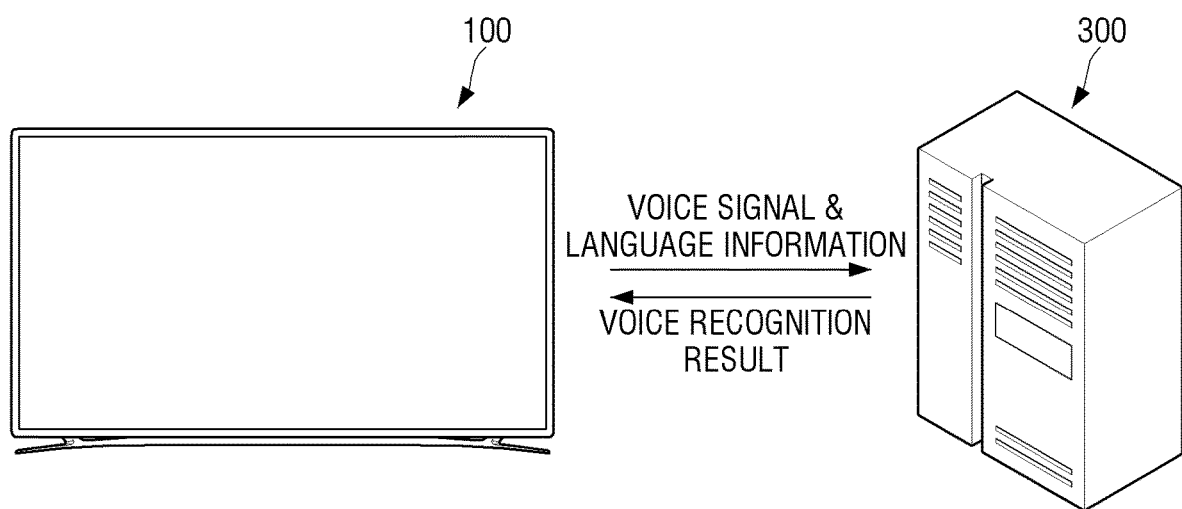
FIG. 3 is a view illustrating a voice recognition system according to an exemplary embodiment of the present disclosure.

FIG. 3 is a view illustrating a voice recognition system according to an exemplary embodiment of the present disclosure.

Referring to FIG. 3, a voice recognition system 200 may include a display apparatus 100 and a server 300. As described with respect to FIG. 2, the system may also include the external apparatus 200.

The display apparatus 100 may operate according to the voice recognition result as described in FIG. 1. The display apparatus 100 and/or the external apparatus 200 may transmit the voice signal corresponding to the voice input through the microphone of the display apparatus 100 or the microphone of the external apparatus 200 to the server 300.

The display apparatus 100 may transmit information indicating which language the voice signal is recognized based on (hereinafter, referred to as 'language information') along with a voice signal to the server 300. The voice recognition result may vary depending on which language voice recognition engine is used although the same voice signal is input.

The server 300 may perform voice recognition of a plurality of different languages. The server 300 may include various voice recognition engines corresponding to respective languages. For example, the server 300 may include a Korean voice recognition engine, an English voice recognition engine, a Japanese voice recognition engine, etc. The server 300 may, in response to a voice signal and language information being received from the display apparatus 100, perform voice recognition by using a voice recognition engine corresponding to a voice signal and language information.

The server 300 may transmit a voice recognition result to the display apparatus 100, and the display apparatus 100 may perform an operation corresponding to the voice recognition result received from the server 300.

For example, when a text included in the voice recognition result received from the server 300 corresponds to a text object included in the display apparatus 100, the display apparatus 100 may perform an operation relating to the text object. For example, when the text included in the voice recognition result corresponds to a text object in a webpage, the display apparatus 100 may display a webpage having a URL address corresponding to the text object. However, the present disclosure is not limited thereto, but user interface (UI) objects provided by various application of the display apparatus 100 may be selected by voice recognition and the corresponding operations may be performed.

The server 300 may be embodied as one server, but the server 300 may be embodied as a plurality of servers respectively corresponding to a plurality of languages. For example, a server for Korean voice recognition and a server for English voice recognition may be separately provided.

In the described example, voice recognition may be performed by the server 300 separate from the display apparatus 100, but according to another embodiment, the display apparatus 100 or the external apparatus 200 may function as the server 300. In other words, the display apparatus 100 or the external apparatus 200 may be integrally embodied with the server 300.

Figure 4:
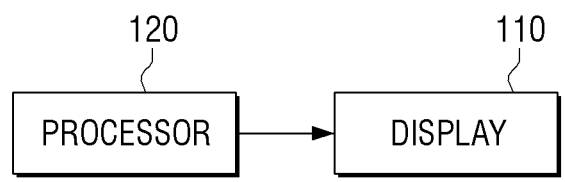
FIG. 4 is a block diagram illustrating a configuration of a display apparatus according to an exemplary embodiment of the present disclosure.

FIG. 4 is a block diagram illustrating a display apparatus according to an exemplary embodiment of the present disclosure.

The display apparatus 100 may include a display 110 and a processor 120.

The display 110 may be implemented as a liquid crystal display (LCD), for example, a cathode ray tube (CRT), a plasma display panel (PDP), organic light emitting diodes (OLED), transparent OLED (TOLED), and the like. In addition, the display 110 may be implemented as a touch screen capable of sensing a user's touch operation.

The processor 120 may control overall operations of the display apparatus 100.

For example, the processor 120 may be a central processing unit (CPU) or microprocessor, which communicates with RAM, ROM, and system bus. The ROM may store a command set for system booting. The CPU may copy the operating system stored in the storage of the display apparatus 100 to the RAM according to the command stored in the ROM, execute the operation system and perform system booting. When the booting is completed, the CPU may copy various applications stored in the storage to the RAM, execute the applications and perform various operations. Although the processor 120 has been described as including only one CPU in the above description, the processor 120 may be embodied as a plurality of CPUs (or DSPs, SoCs, etc.) or processor cores.

In response to receiving a user commend for selecting an object displayed on the display 110 being, the processor 120 may perform an operation relating to the object selected by a user command. The object may be any one of selectable objects, for example, a hyperlink or an icon. The operation relating to the selected object may be, for example, an operation of displaying page, document, image, etc. connected to the hyperlink, or an operation of executing a program corresponding to the icon.

A user command for selecting an object may be a command input through various input devices (e.g., a mouse, a keyboard, a touch pad, etc.) connected to the display apparatus 100, or a voice command corresponding to a voice uttered by a user.

Although not shown in FIG. 4, the display apparatus 100 may further include a voice receiver for receiving user voice. The voice receiver may directly receive a user voice through a microphone and generate a voice signal, or receive an electronic voice signal from the external apparatus 200. When the voice receiver receives the electronic voice signal from the external apparatus 200, the voice receiver may be embodied as a communicator for performing wired/wireless communication with the external apparatus 200. The voice receiver may not be included in the display apparatus 100. For example, a voice signal corresponding to the voice input through the microphone of the external apparatus 200 may be transmitted to the server 300 via another apparatus, not the display apparatus 100, or may be directly transmitted from the external apparatus 200 to the server 300. In this case, the display apparatus 100 may receive only the voice recognition result from the server 300.

The processor 120 may control the display 110 to display a text object in a different language from a preset language among the text objects displayed on the display 110, along with a number.

The preset language may refer to a basic language for voice recognition (language of a voice recognition engine to be used for voice recognition). The preset language may be manually set by a user or automatically set. When the preset language is manually set by the user, for example, a language set as a language (or a system language) used in a setting menu of the display apparatus 100 may be set as the basic language for voice recognition.

When the preset language is automatically set, the processor 120 may identify the language mostly used for the text objects displayed on the display 110 and set the language as the basic language for voice recognition.

To be specific, the processor 120 may analyze the types of characters (e.g., Korean or alphabet) contained in each of the plurality of text objects displayed on the display 110, and set a language of the characters mostly used for the plurality of text objects as a basic language for voice recognition.

According to another embodiment, when the text objects displayed on the display 110 are included in a webpage, the processor 120 may set a language corresponding to language information of the webpage as a basic language for voice recognition. The language information of the webpage may be confirmed by the lang attribute of HTML (e.g., <html lang="en">).

When the basic language for voice recognition is set, the processor 120 may control the display 110 to display a text object in a different language from a basic language along with a preset number. The user may select a text object by uttering a preset number displayed on the display 110. In addition, since an image may not be selected by voice, the processor 120 may control the display 110 to display an image object along with a preset number.

The processor 120 may determine a text object in languages other than the basic language for voice recognition as a text object in a language different from the basic language for voice recognition. The processor 120 may determine a text object in at least two languages as a text object in a language different from the basic language for voice recognition if a ratio of the preset language is smaller than a predetermined ratio.

Figure 5:
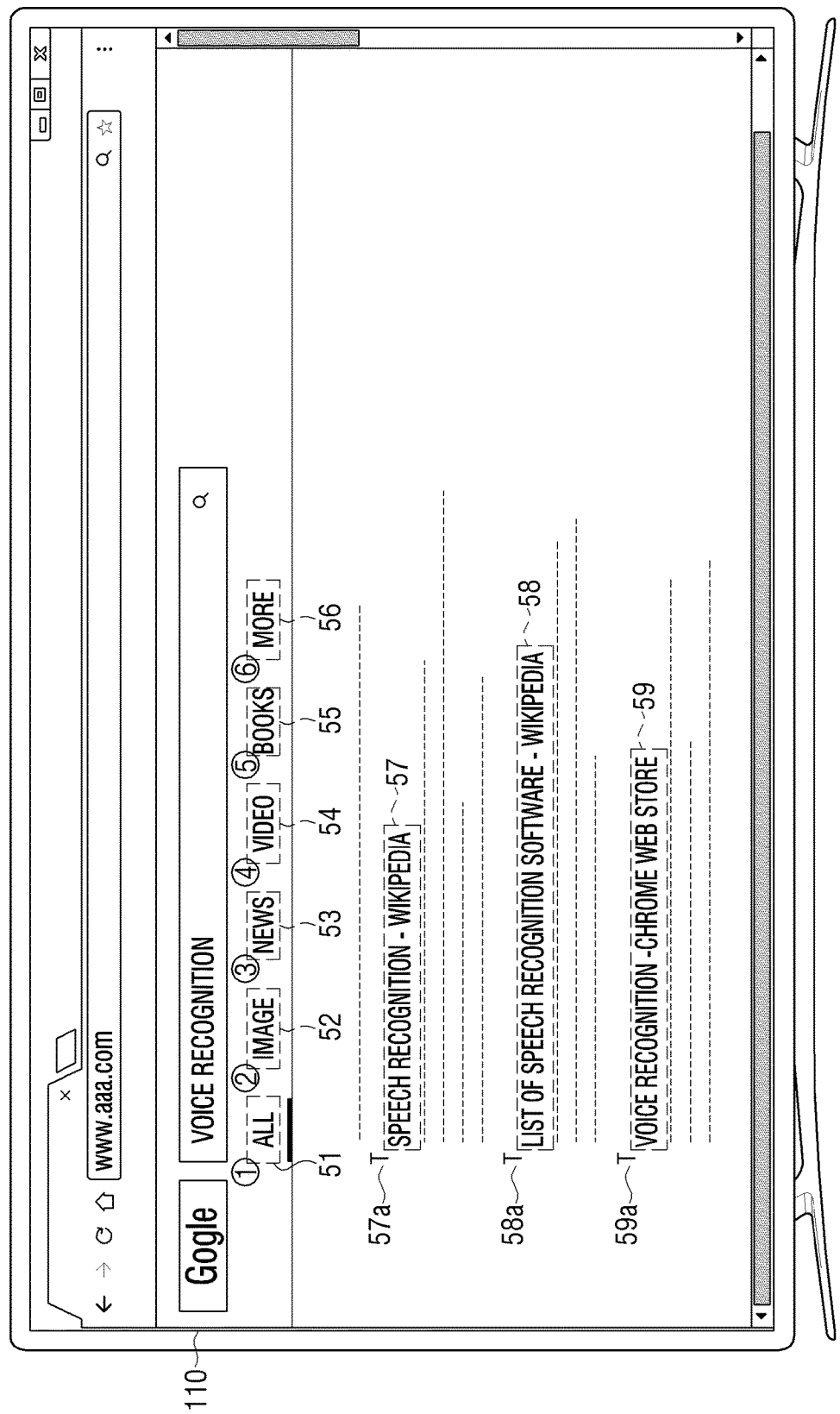
FIGS. 5, 6, and 7 are views illustrating display a number for selecting an object according to exemplary embodiments of the present disclosure.

FIG. 5 is a view illustrating a screen displayed on the display apparatus.

Referring to FIG. 5, a UI screen including a plurality of text objects 51 to 59 may be displayed on the display 110. When the basic language for voice recognition is English, the processor 120 may control the display to display text objects 51 to 56 in a language other than English along with preset numbers ① to ⑥. The preset numbers ① to ⑥ may be displayed to be adjacent to the corresponding text objects 51 to 56. The text objects 51 and 58 in English may be displayed together with specific icons 57A and 58A to inform a user that the text objects 51 and 58 may be selected by uttering the text included in the text objects 51 and 58. The icons 57A and 58A may be represented by "T" as shown in FIG. 5, but are not limited thereto, but represented by various forms such as "Text".

With regard to the text object 59 in at least two languages, the processor 120 may confirm whether a ratio of English is greater than a predetermined ratio (e.g., 50%), and if the ratio is smaller than the predetermined ratio, control the display to display the text object 59 in at least two languages along with a number. The text object 59 in FIG. 5 may be in both Korean and English, but a number may not be displayed together since a ratio of English is greater that the predetermined ratio (e.g., 50%). Instead, by uttering a text included in the text object, an icon 59A indicating that the text object is selectable may be displayed to be adjacent to the text object 59.

Referring to FIG. 5, numerals are shown to have a form, for example, "①", but the forms of numbers are not limited. For example, a square or a circle may wrap around number "1", or the number may be simply expressed by "1". According to another embodiment of the present disclosure, it may be expressed by a word of a basic language for voice recognition. If a basic language for voice recognition is English, the number may be expressed by "one" or if the language is Spanish, the number may be expressed by "uno".

Although not shown in FIG. 5, a phase that encourages a user to say a number such as "you can select an object corresponding to the said number" may be further displayed along with the number on the display 100.

According to another exemplary embodiment, if a first word of the text object in at least two languages is different from a language used for speech recognition, the processor 120 may determine that the text object is different from a text object in the basic language for voice recognition.

Figure 6:
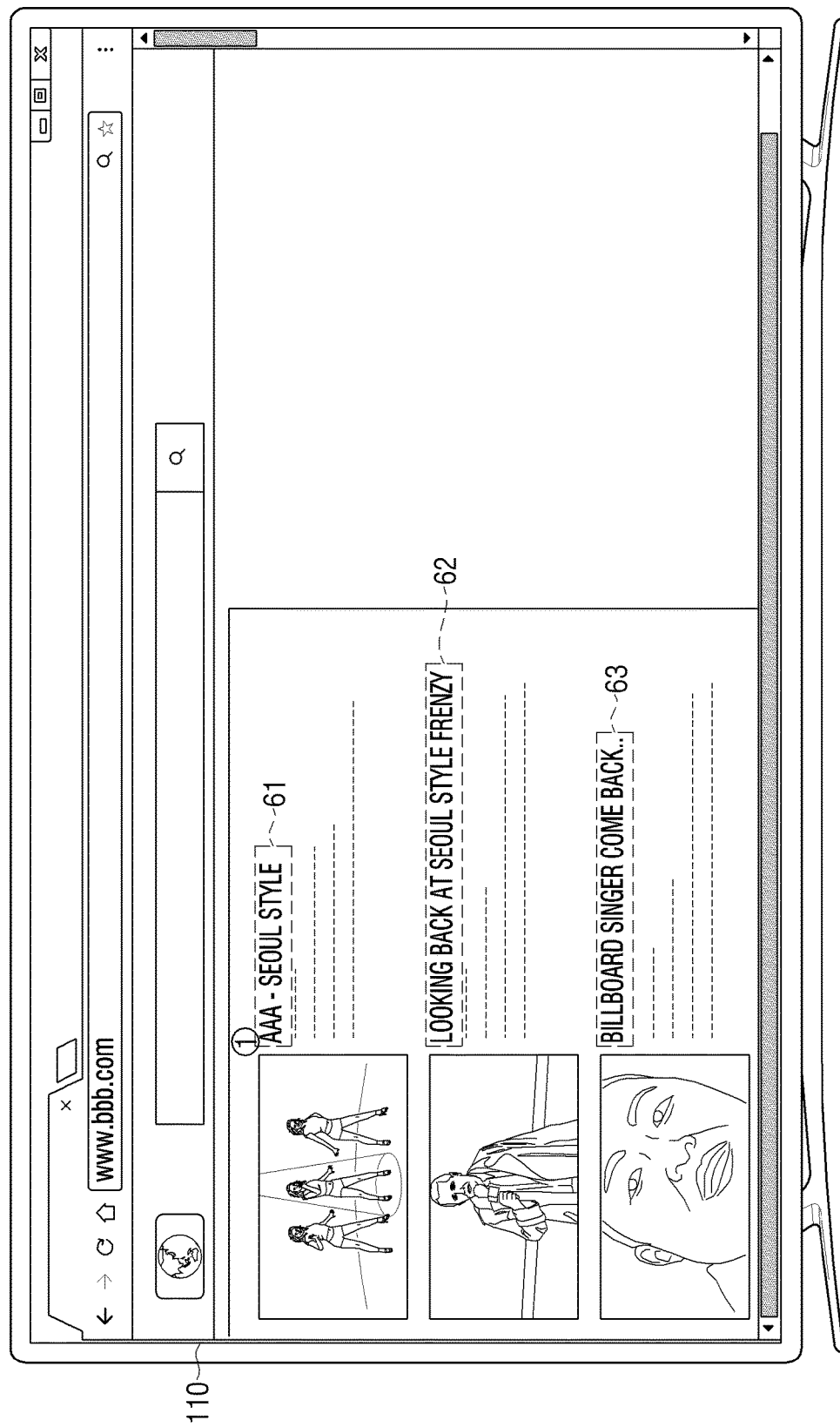

FIG. 6 is a view illustrating a screen displayed on the display.

Referring to FIG. 6, a UI screen including a plurality of text objects 61 to 63 may be displayed on the display 110. When the language to be used for voice recognition is Korean, the processor 120 may determine the text object 61 in at least two languages as a text object in a different language from the basic language for voice recognition since the first word "AAA" of the text object 61 is English, not Korean which is the basic language for voice recognition. Therefore, the processor 120 may control the display 110 to display the text object 61 along with the number ①.

According to an exemplary embodiment with reference to FIG. 6, even if a ratio of the basic language for voice recognition is greater than a predetermined ratio in a text object in at least two languages, if the first word of the text object is not in the basic language for voice recognition, a number may also be displayed. Conversely, even if a ratio of the basic language for voice recognition is smaller than a predetermined ratio in a text object in at least two languages, if the first word of the text object is in the basic language for voice recognition, a number may not be displayed. This is because the user may be likely to utter the first word of a text object to select the text object.

According to another exemplary embodiment, an image object may not be selected by voice. Therefore, a number may be displayed together with the image object.

Figure 7:
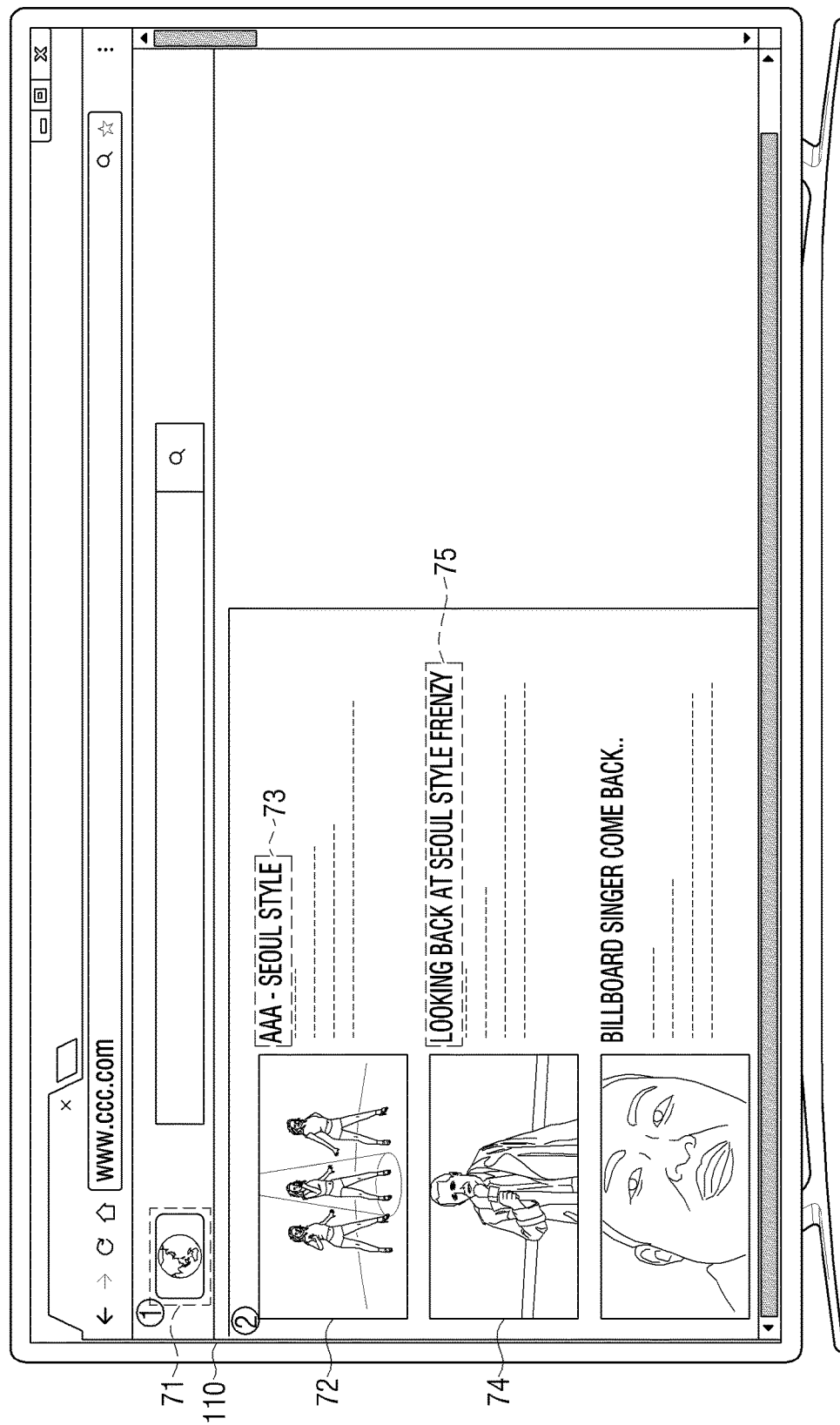

FIG. 7 is a view illustrating a screen displayed on the display.

Referring to FIG. 7, a first image object 71, a second image object 72, a third image object 74, a first text object 73, and a second text object 75 may be displayed on the display 110. The processor 120 may control the display 110 to display the image object 71 together with the number ①.

According to another exemplary embodiment, when a plurality of objects displayed on the display 110 each have a URL link, the processor 120 may compare the URL links of the plurality of objects. If the objects having the same URL link are not selectable by voice recognition, the processor 120 may control the display 110 to display a number together with one of the plurality of objects, and if any one of the plurality of objects is selectable by voice recognition, the processor 120 may control the display 110 not to display a number.

To be specific, when a plurality of objects, which are not selectable by voice recognition (i.e. a text object in a different language from a basic language for voice recognition, or an image object), are displayed on the display 110 with the same URL link, a number may be displayed nearby one of the plurality of objects. Referring to FIG. 7, the second image object 72 may not be selectable by voice, and the first text object 73 may be in a language different from Korean, which is the basic language for voice recognition. Therefore, since both the second image object 72 and the first text object 73 are not selected by voice, but both are connected to the same URL link when selected, the number ② may be displayed nearby the second image object 72, or nearby the first text object 73. This is to reduce the number of numbers displayed on the display 110.

To reduce the number of numbers displayed on the display 110, according to another exemplary embodiment, the plurality of objects having the same URL address may be displayed on the display 110, and if any one of the plurality of objects is a text object in the basic language, a number may not be displayed. Referring to FIG. 7, the processor 120 may compare the URL address of the third image object 74 with the URL address of the second text object 75, and if it is determined that the URL address of the third image object 74 is the same as the URL address of the second text object 75, and the second text object 75 is a text object in Korean, which is a basic language for voice recognition, the processor 120 may control the display 110 not to display a number nearby the third image object 74.

If a recognition result of a voice uttered by a user includes a specific text displayed on the display 110, the processor 120 may perform an operation relating to a text object corresponding to the text. Referring to FIG. 5, if a user says "voice recognition", the processor 120 may control the display 110 to display a page having the URL address corresponding to the text object 59.

According to an exemplary embodiment, when the recognition result of the voice uttered by the user includes a text commonly included in at least two text objects among the plurality of text objects displayed on the display 110, the processor 120 may display a number nearby each of the text objects, and when the user utters the displayed number, perform an operation relating to a text object corresponding to the number.

Referring to FIG. 5, when the recognition result of the voice uttered by the user includes a text "speech recognition", the processor 120 may search for a text object including the phrase "speech recognition" from among the displayed text objects. When a plurality of text objects 57 and 58 are searched, the processor 120 may control the display 110 to display a preset number nearby each of the text objects 57 and 58. For example, when the number ⑦ is displayed nearby the text object 57, and the number ⑧ is displayed nearby the text object 58, the user may select the text object 57 by uttering the number "7". When the voice recognition result includes a number displayed on the display 110, the processor 120 may perform an operation relating to a text object or an image object corresponding to the number.

Referring to FIG. 6, if the user says "one", the processor 120 may control the display 110 to display the page having the URL address corresponding to the text object 61.

A voice uttered by a user may be input through the microphone of the display apparatus 100 or the microphone of the external apparatus 200. When the user voice is input through the microphone of the external apparatus 200, the display apparatus 100 may include a communicator to perform communication with the external apparatus 200 including the microphone and the communicator may receive a voice signal corresponding to the voice input through the microphone of the external apparatus 200. The processor 120 may, if the recognition result of the voice signal received from the external apparatus 200 through the communicator includes the number displayed on the display 110, perform an operation relating to the text object corresponding to the number. Referring to FIG. 6, when the user says "one" input via the microphone of the external apparatus 200, the external apparatus 200 may transmit a voice signal to the display apparatus 100, and the processor 120 may control the display 110 to display the page having the URL address corresponding to the text object 61 based on the voice recognition result of the received voice signal.

A number displayed corresponding to a text or an image object may be displayed during a predetermined period of time. According to an exemplary embodiment, the processor 120 may control the display 110 to display numbers while a signal corresponding to selection of a specific button is received from the external apparatus 200. In other words, the number may be displayed only while a user presses a specific button of the external apparatus 200. The specific button may be, for example, a microphone button 210 of the external apparatus 200 described in FIG. 2.

According to another exemplary embodiment, the processor 120 may control the display 110 to display numbers if voice input through the microphone of the display apparatus 100 includes a predetermined keyword (e.g., "Hi TV"), and remove the displayed numbers if a predetermined period of time passes in response to the voice input through the microphone of the display apparatus 100 not being input.

The above embodiments describe that a number is displayed, but the indicator does not have to be a number, but may be anything that a user can see and read (a meaningful word or a meaningless word). For example, a, b and c . . . may be displayed instead of 1, 2 and 3. Alternatively, any other symbol may be employed.

According to another exemplary embodiment, when a webpage displayed on the display 110 includes a search window, a user may easily perform searching by uttering a word to be searched or a specific keyword for executing a search function. For example, when the webpage displayed on the display 110 includes a search window, the search result of "xxx" may be displayed on the display 110 by uttering "xxx search", "search for xxx", or the like.

To this end, the processor 120 may detect a search word input window from the webpage displayed on the display 110. Specifically, the processor 120 may search an object available to input from among the objects of the webpage displayed on the display 110. The input tag on the HTML may be an object available to input. The input tag may have various kinds of attributes, but the type attributes may clearly define input characteristics. When the type is "search", the object may correspond to the search word input window.

However, when the type of the object is "text", it cannot be immediately determined whether the object is a search word input window. It is difficult to determine whether the object is a search word input window or a typical input window since the typical input objects have a text type. Therefore, a further process is needed to determine whether the object is a search word input window.

When the type of the object is "text", information on the additional attributes of the object may be referenced to determine whether the object is a search word input window. When the title or the area-label includes a "search" keyword, the object may be determined as a search word input window.

The processor 120 may determine whether the recognition result of the voice uttered by the user includes a specific keyword. The specific keyword may be "search", "retrieve", etc. In response to determining a specific keyword being included, the processor 120 may confirm the positon of the specific keyword to more clearly determine user's intention. If at least one word exits before or after the specific keyword, a user may likely to search the at least one word. If only a specific word such as "search" or "retrieve" is included in the voice recognition result, a user may be unlikely to search for the word.

The user's intention determination process may be performed by the display apparatus 100, or by the server 300 and the result thereof may be provided to the display apparatus 100.

Figure 8:
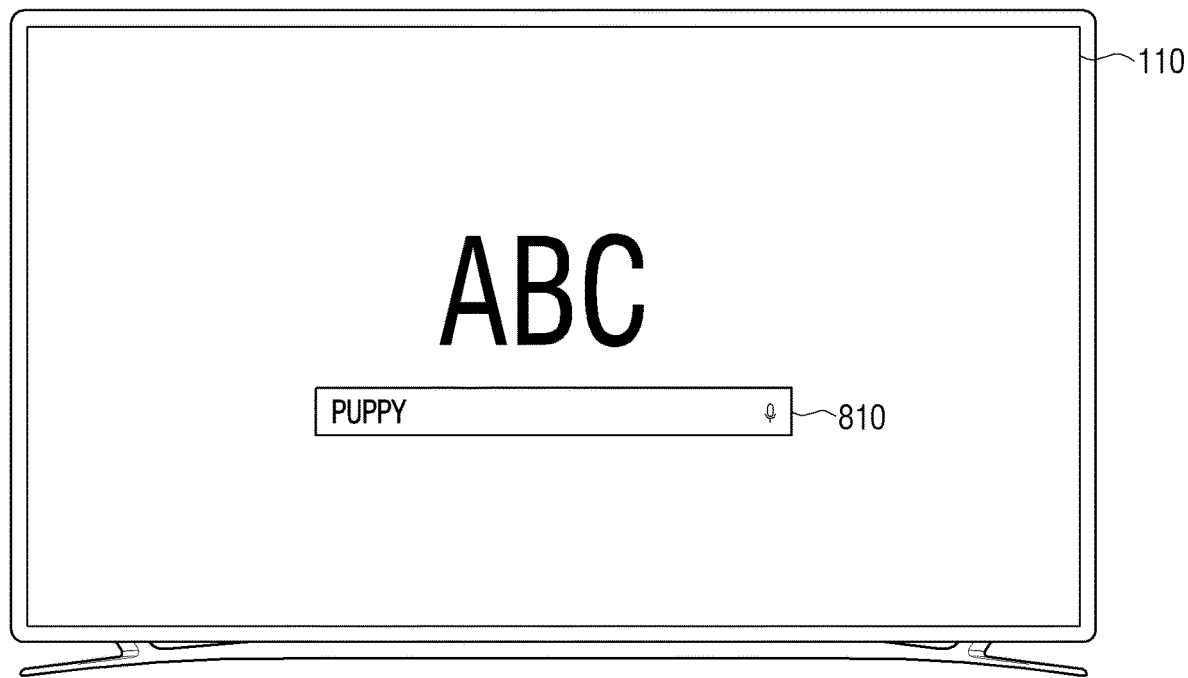
FIGS. 8 and 9 are views illustrating a voice searching method according to exemplary embodiments of the present disclosure.

If the user's search intention is determined, the processor 120 may set words (except the specific keyword) as a search word, input the set search word into the search word input window detected by performing the above process and perform searching. For example, as shown in FIG. 8, if the webpage including a search word input window 810 is displayed on the display 110, the processor 120 may detect the search word input window 810, and if the user says "search puppy" by voice, the processor 120 may set the "puppy" as a search word in the voice recognition result of the uttered voice, input the search word into the search word input window 810 and perform searching.

The search word input window from the webpage displayed in the display 110 may be detected after or before the voice recognition result is determined to include a specific keyword.

Figure 9:
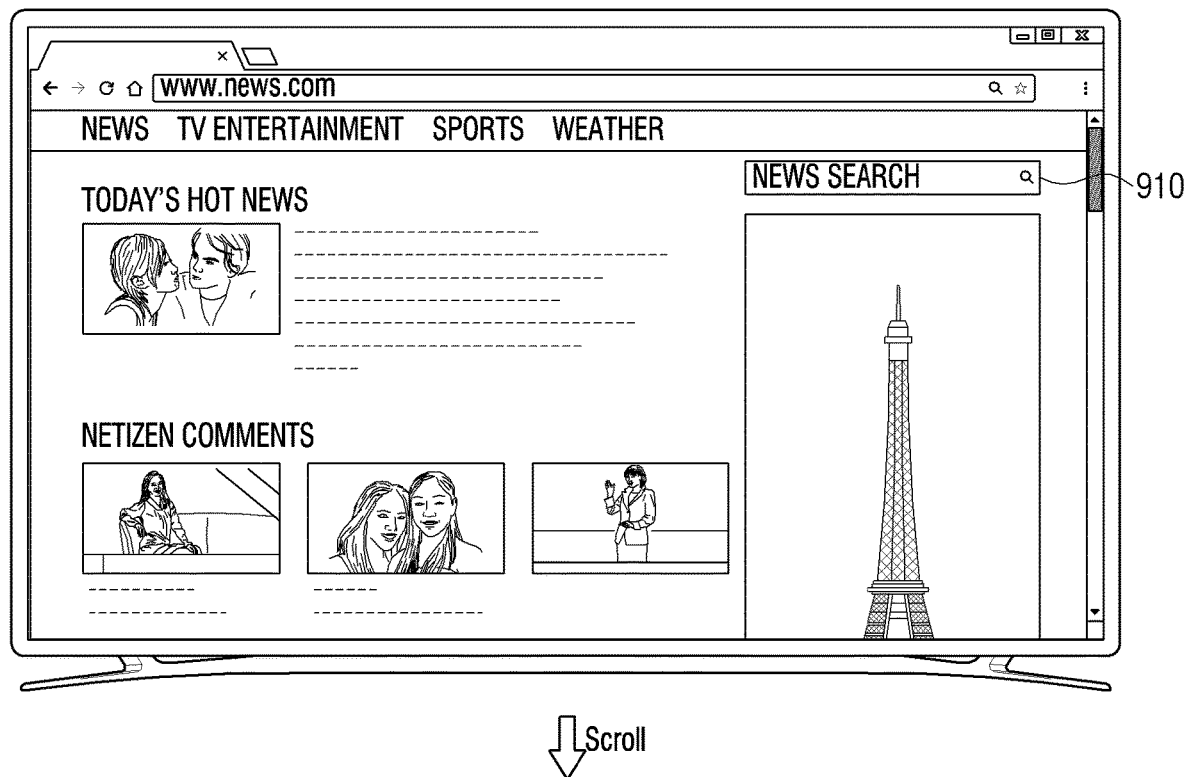
Figure 9:
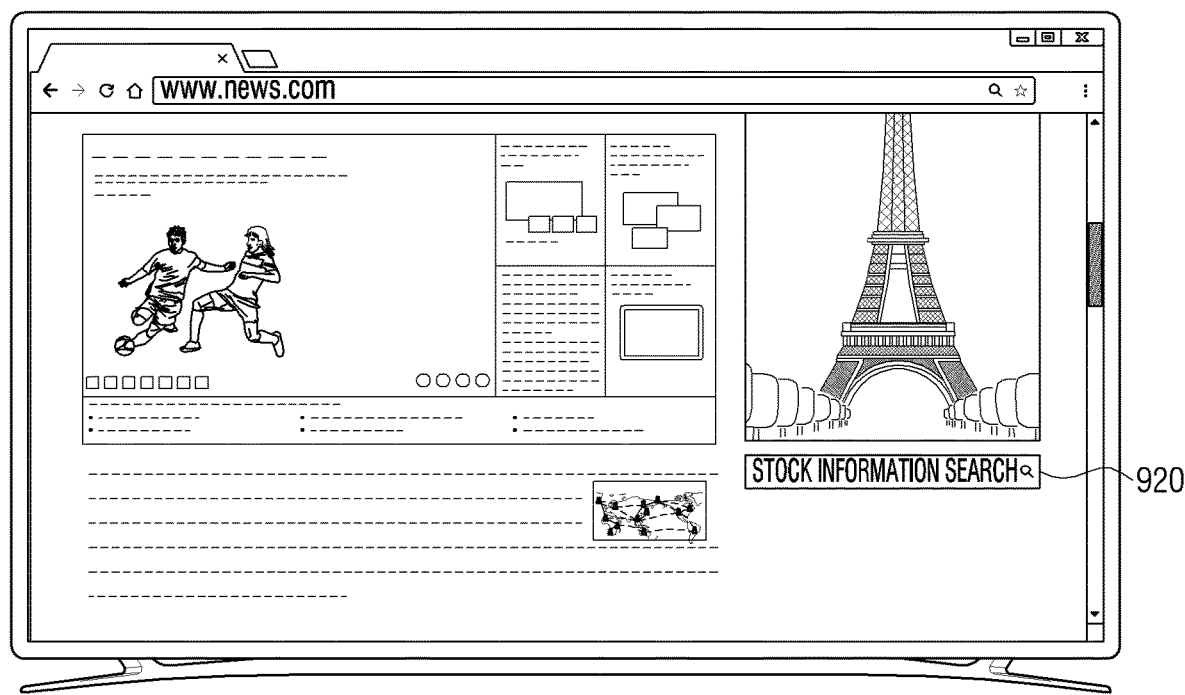

FIG. 9 is a view illustrating a method for inputting a search word. For example, the method may include a method for searching a plurality of search word input windows in one webpage.

Referring to FIG. 9, there may be two search word input windows in one webpage. A first search word input window 910 may be for news search, and a second search word input window 920 may be for stock information search. The processor 120 may perform searching using the search word input window displayed at the time when a user utters a voice including the search word based on information on the positions of objects and information on screen layout. For example, when the first search word input window 910 is displayed on the display 110 and a user utters a voice including a search word and a specific keyword, the processor 120 may input the search word into the first search word input window 910, and after the screen is scrolled, when the second search word input window 920 is displayed on the display 110 and the user utters a voice including the search word and the specific keyword, the processor 120 may input the search word into the second search word input window 920. In other words, when a plurality of search word input windows exist in one webpage, the search word input window that is currently seen may be used for performing search.

A voice control may be performed based on the screen of the display 110. Basically, a function according to a voice command may be performed using an application on the screen of the display 110. However, when the input voice command does not match with the object included in the display screen, or does not relate to a function of the application displayed on the screen, another application may be executed and the function according to the voice command may be performed.

For example, when the executing application is a web browsing application, and a voice uttered by a user does not match with an object in the webpage displayed by the web browsing application, the processor 120 may execute another predetermined application and perform a search function corresponding to the voice uttered by the user. The predetermined application may be an application that provides a search function, for example, an application for providing the search result of the text corresponding to a voice by using a search engine, an application for providing the search result of video on demand (VOD) contents according to the text corresponding to the voice, or the like. Before the predetermined application is executed, the processor 120 may display a UI for receiving user agreement "there is no result corresponding to xxx on the screen. do you wish to search for xxx on the Internet?", or provide the search result by executing an Internet search application after the user agreement is input on the UI.

The display apparatus 100 may include a voice processor for processing the voice recognition result received from the server 300 and an application unit for executing an application provided in the display apparatus 100. The voice processor may provide the voice recognition result received from the server 300 to the application unit. When the recognition result is provided while the first application of the application unit is executed and the screen of the first application is displayed on the display 110, the first application may perform the above described operation based on the voice recognition result received from the voice processor. For example, searching for text or image object corresponding to the number included in the voice recognition result, searching for text object corresponding to the word included in the voice recognition result, or the performing search after the keyword is input on the search window when the "search" is included in the voice recognition result, may be performed.

If there is no operation to be performed by using the voice recognition result the first application receives from the voice processor, that is, a text object or an image object corresponding to the voice recognition result is not present, or a search window is not present, the first application may output a result indicative of such to the voice processor, and the voice processor may control the application unit to execute a second application that executes an operation relating to the voice recognition result. For example, the second application may be an application that provides the search result of the specific search word. The application unit may execute the second application and provide the search result of the text included in the voice recognition result which is used as a search word.

Figure 10:
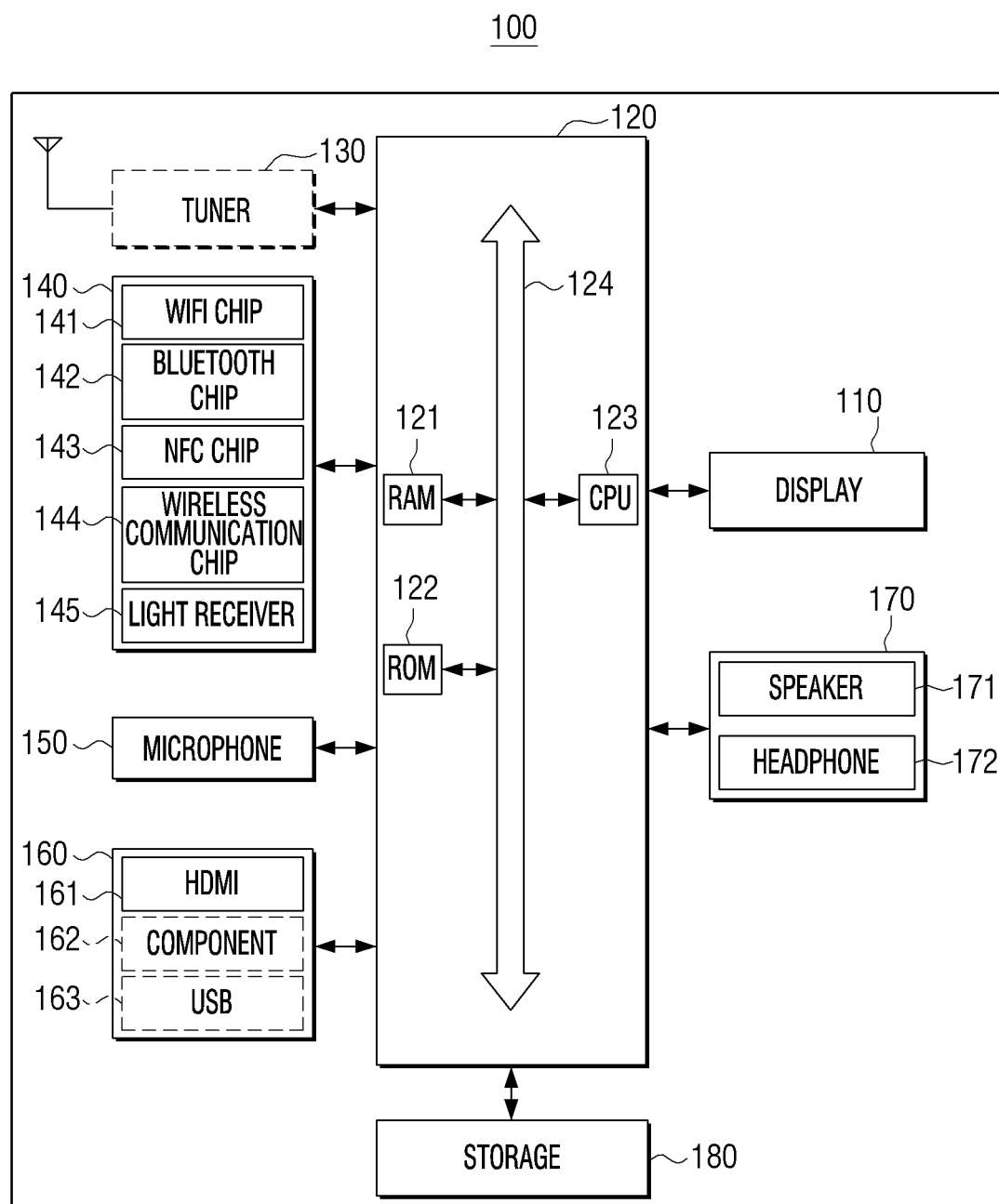
FIG. 10 is a block diagram illustrating a display apparatus according to an exemplary embodiment of the present disclosure.

FIG. 10 is a block diagram illustrating a configuration of the display apparatus. In describing FIG. 10, the redundant descriptions of FIG. 4 will be omitted.

Referring to FIG. 10, examples of the display apparatus 100 may be an analog TV, a digital TV, a 3D-TV, a smart TV, an LED TV, an OLED TV, a plasma TV, a monitor, a screen TV with a fixed curvature screen, a flexible TV with a fixed curvature screen, a bended TV with a fixed curvature screen, and/or a curvature-variable TV of which screen curvature varies depending on the received user input, or the like, but is not limited thereto. As discussed above, the display apparatus 100 may be any variety of display apparatus, including a PC, smartphone, etc.

The display apparatus 100 may include a display 110, a processor 120, a tuner 130, a communicator 140, a microphone 150, an input/output unit 160, an audio output unit 170 and a storage 180.

The tuner 130 may select a channel by tuning a frequency of the channel to be received by the display apparatus 100 among a number of radio wave components through amplification, mixing and resonance of a broadcasting signal received in wired/wireless manner. The broadcasting signal may include video, audio or additional data (e.g., Electronic Program Guide (EPG)).

The tuner 130 may receive video, audio and data in a frequency band corresponding to a channel number corresponding to user input.

The tuner 130 may receive a broadcasting signal from various sources such as terrestrial broadcasting, cable broadcasting, or satellite broadcasting. The tuner 130 may receive a broadcasting signal from various sources such as analog broadcasting or digital broadcasting.

The tuner 130 may be integrally embodied with the display apparatus 100 as a unitary unit in all-in-all shape or embodied as an additional device (e.g., a set-top box or a tuner connected to the input/output unit 160) including a tuner unit electrically connected to the display apparatus 100.

The communicator 140 may perform communication with various types of external apparatuses according to various types of communication methods. The communicator 140 may be connected to an external apparatus through a Local Area Network (LAN) or an Internet network, and may be connected to the external apparatus via wireless communication (e.g., Z-wave, 4LoWPAN, RFID, LTE D2D, BLE, GPRS, Weightless, Edge Zigbee, ANT+, NFC, IrDA, DECT, WLAN, Bluetooth, WiFi, Wi-Fi Direct, GSM, UMTS, LTE, WiBRO, etc.). The communicator 140 may include various communication chips such as a Wi-Fi chip 141, a Bluetooth chip 142, an NFC chip 143, a wireless communication chip 144, and the like. The Wi-Fi chip 141, the Bluetooth chip 142, and the NFC chip 143 may communicate with each other using WiFi, Bluetooth, or NFC, respectively. The wireless communication chip 174 may be a chip that performs communication according to various communication standards such as IEEE, ZigBee, 3rd Generation (3G), 3rd Generation Partnership Project (3GPP), Long Term Evolution (LTE), etc. The communicator 140 may also include a light receiving unit 145 capable of receiving a control signal (e.g., an IR pulse) from the external apparatus 200.

The processor 120 may transmit a voice signal and language information (information on a basic language for voice recognition) to the server 300 through the communicator 140, and when the server 300 transmits the result of the voice recognition performed with respect to the voice signal by using a voice recognition engine of language corresponding to the language information, the processor 120 may receive the result of the voice recognition through the communicator 140.

The microphone 150 may receive a voice uttered by a user and generate a voice signal corresponding to the received voice. The microphone 150 may be embodied integrally with or separately from the display apparatus 100. The separated microphone 150 may be electrically connected to the display apparatus 100.

When a microphone is not included in the display apparatus 100, the display apparatus 100 may receive a voice signal corresponding to the voice input through the microphone of the external apparatus 200 from the external apparatus 200 through the communicator 140. The communicator 140 may receive a voice signal from the external apparatus 200 using WiFi, Bluetooth, etc.

The input/output unit 160 may be connected to an apparatus. The input/output unit 160 may include at least one of a high-definition multimedia interface (HDMI) port 161, a component input jack 162 and a USB port 163. In addition, the input/output unit 160 may include at least one of ports such as RGB, DVI, HDMI, DP, and thorn volt.

The audio output unit 170 may output audio, for example, audio included in a broadcasting signal received through the tuner 130, audio input through the communicator 140, the input/output unit 160, or the like, or audio included in an audio file stored in the storage 180. The audio output unit 170 may include a speaker 171 and a headphone output terminal 172.

The storage 180 may include various application programs, data, software modules for driving and controlling the display apparatus 100 under the control of the processor 120. For example, the storage 180 may include a web parsing module for parsing web contents data received through the Internet network, a JavaScript module, a graphic processing module, a voice recognition result processing module, an input processing module, etc.

When the display apparatus 100 itself performs voice recognition rather than the external server 300, the storage 180 may store a voice recognition module including various voice recognition engines for various languages.

The storage 180 may store data for forming various UI screens provided by the display 110. The storage 180 may store data for generating control signals corresponding to various user interactions.

The storage 180 may be implemented as a nonvolatile memory, a volatile memory, a flash memory, a hard disk drive (HDD), or a solid state drive (SSD). The storage 180 may be implemented not only as a storage medium in the display apparatus 100 but also as an external storage medium such as a micro SD card, a USB memory, or a web server through a network.

The processor 120 may control overall operations of the display apparatus 100, control signal flow between internal constituents in the display apparatus 100, and process data.

The processor 120 may include a RAM 121, a ROM 122, a CPU 123, and a bus 124. The RAM 121, the ROM 122 and the CPU 123 may be connected to each other via the bus 124. The processor 120 may be implemented as a System On Chip (SoC).

The CPU 123 may access the storage 180 and perform booting using the operation system stored in the storage 180. In addition, the CPU 123 may perform various operations by using various programs, contents, and data stored in the storage 180.

The ROM 122 may store a command set for system booting. If a turn-on command is input and power is supplied, the CPU 123 may copy the operation system stored in the storage 180 to the RAM 121 according to the command stored in the ROM 122, execute the operation system and perform booting of the system. When the booting is completed, the CPU 123 may copy various programs stored in the storage 180 to the RAM 121, execute the application program copied to the RAM 121 and perform various operations.

The processor 120 may perform various operations by using modules stored in the storage 180. For example, the processor 120 may perform parsing and processing of web contents data received through the Internet network and display the overall layout of the contents and the object on the display 110.

When a voice recognition function is enabled, the processor 120 may analyze objects of the web contents, search an object controllable by voice, perform pre-processing of information on the object position, the object related operation and the text in the object and store the pre-processing result in the storage 180.

The processor 120 may control the display 110 to display selectable objects (controllable by voice) to be identified based on the pre-processed object information. For example, the processor 120 may control the display 110 to display the colors of the object controllable by voice differently from other objects.

The processor 120 may recognize the voice input through the microphone 150 as text by using a voice recognition engine. The processor 120 may use a voice recognition engine of a preset language (a basic language for voice recognition). The processor 120 may transmit information on the voice signal and the basic language for voice recognition to the server 300 and receive text as the voice recognition result from the server 300.

The processor 120 may search an object corresponding to the voice recognition result among the pre-processed objects and indicate that the object is selected at the position of the searched object. For example, the processor 120 may control the display to highlight the selected object by voice. The processor 120 may perform the operation relating to the object corresponding to the voice recognition result based on the pre-processed object information and output the result through the display 110 or the audio output unit 170.

Figure 11:
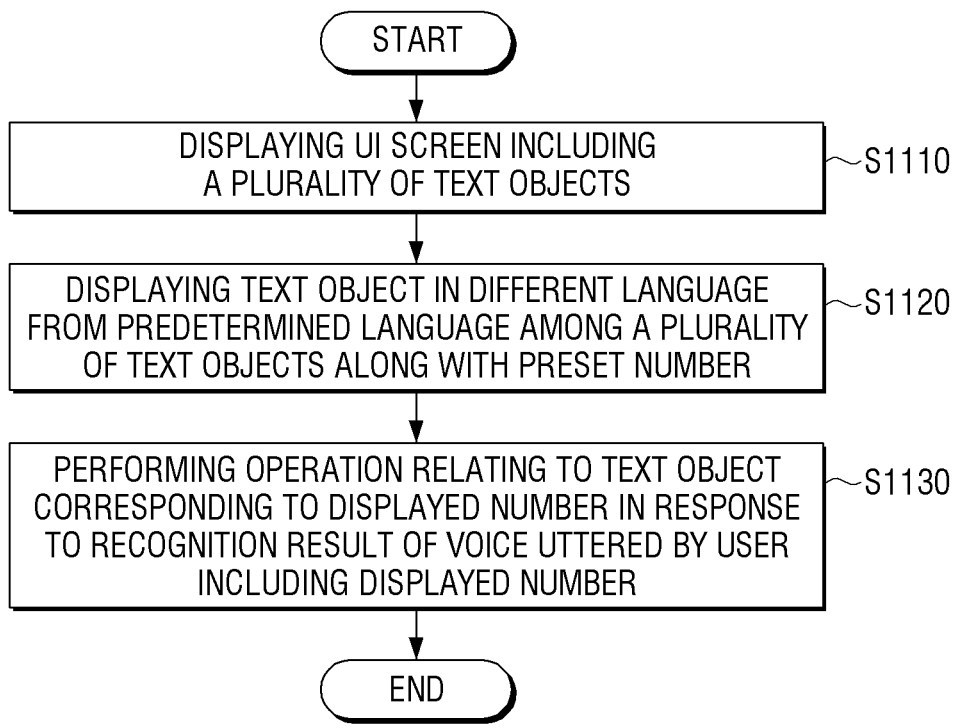
FIG. 11 is a flowchart illustrating a method of controlling a display apparatus according to an exemplary embodiment of the present disclosure.

FIG. 11 is a flowchart illustrating a method of controlling a display apparatus according to an exemplary embodiment of the present disclosure.

The flowchart shown in FIG. 11 shows the operations processed by the display apparatus 100 described herein. Therefore, although the repetitive description is omitted below, the description of the display apparatus 100 may be applied to the flowchart of FIG. 11

Referring to FIG. 11, the display apparatus 100 may display a UI screen including a plurality of text objects at step S1110.

The display apparatus 100 may display a text object in a language different from a preset language among the plurality of text objects displayed on the display apparatus, along with a preset number at step S1120. The preset language may refer to a basic language for voice recognition, which is determined in advance. The basic language may be a default language, or may be manually set by a user or automatically set based on the language used for the objects displayed on the display 110. When the basic language is automatically set, optical character recognition (OCR) may be applied to the objects displayed on the display apparatus 100 to confirm the language used for the object.

When the recognition result of the voice uttered by the user includes the displayed number, the operation relating to the text object corresponding to the displayed number may be performed at step S1130.

The recognition result of the voice uttered by the user may be obtained from the voice recognition of the display apparatus itself, or by sending a request for voice recognition to the external server performing voice recognition with respect to a plurality of different languages. By sending a request for voice recognition, the display apparatus 100 may provide information on the voice signal corresponding to the voice uttered by the user and the basic language for voice recognition to the external server, and when the voice recognition result received from the external server includes the displayed number, perform the operation relating to the text object corresponding to the displayed number.

For example, when a text object is a hyperlink text in the webpage, an operation of displaying the webpage having a URL address corresponding to the text object may be performed, and if the text object is an icon for executing an application, the application may be executed.

The UI screen including the plurality of text objects may be an execution screen of the first application. The execution screen of the first application may be any screen provided by the first application. While the execution screen of the first application is displayed, if it is determined that the object corresponding to the recognition result of the voice uttered by the user is not present on the execution screen of the first application, the display apparatus may execute a second application different from the first application and perform the operation corresponding to the recognition result of the voice. The first application may be a web browsing application, and the second application may be an application for performing search in various sources, for example, the Internet, data stored in the display apparatus, VOD contents, channel information (e.g., EPG). For example, when an object corresponding to the voice recognition is not present in the displayed web page, the display apparatus may execute another application and provide the search result corresponding to the voice recognition (e.g., a search engine result, a VOD search result, a channel search result or the like).

According to the above described exemplary embodiment, objects in various languages may controlled by voice and the voice search may be easily performed.

The exemplary embodiments described above may be implemented in a recording medium that can be read by a computer or similar device using software, hardware, or a combination thereof. In accordance with a hardware implementation, the exemplary embodiments described in this disclosure may be implemented using at least one of application specific integrated circuits (ASICs), digital signal processors (DSPs), digital signal processing devices (DSPDs), programmable logic devices (PLDs), field programmable gate arrays (FPGAs), a processor, a controller, a micro-controller, a microprocessor, and an electrical unit for performing other functions. In some cases, the exemplary embodiments described herein may be implemented by processor 120 itself. According to a software implementation, exemplary embodiments such as the procedures and functions described herein may be implemented in separate software modules. Each of the software modules may perform one or more of the functions and operations described herein.

Computer instructions for performing the processing operations in the display apparatus 100 according to exemplary embodiments of the present disclosure described above may be stored on a non-transitory computer readable medium. The computer instructions stored in the non-volatile computer readable medium cause the processor and other components of the particular apparatus to perform the processing operations in the display apparatus 100 according to various embodiments described above, when executed by the processor of the specific apparatus.

Non-volatile computer readable medium means a medium that semi-permanently stores data and can be read by a device, not a medium that stores data for a short period of time such as a register, a cache, a memory, etc. Specific examples of non-transitory computer readable media include CD, DVD, hard disk, Blu-ray disk, USB, memory card, ROM, and the like.

Although exemplary embodiments have been shown and described, it will be appreciated by those skilled in the art that changes may be made to these exemplary embodiments without departing from the principles and spirit of the present disclosure. However, the technical range of the present invention is not limited to the detailed description of the specification but defined by the range of the claims but it will be understood by those of skill in the art that various changes in form and details may be made without departing from the spirit and scope of the invention as set forth in the following claims.

What is claimed is:

1. A display apparatus, comprising:
   a display; and
   a processor configured to:
   control the display to display a first screen including a plurality of objects,
   receive a voice signal corresponding to a voice input received using a microphone of the display apparatus or an external apparatus,
   process the voice signal to obtain a voice recognition result comprising a text,
   determine that the text is included in the displayed plurality of objects,
   based on determining that the text is included in a single object among the displayed plurality of objects, perform an operation related to the single object, and
   based on determining that the text is commonly included in at least two objects among the displayed plurality of objects, control the display to display a modified first screen which additionally includes at least two icons,
   wherein each icon of the at least two icons represents a number, and is displayed adjacent to a corresponding object from among the at least two objects.

2. The display apparatus as claimed in claim 1, wherein the display apparatus further comprises a communicator, and wherein the processor is further configured to:
   control the communicator to transmit the voice signal to a server, and
   receive, using the communicator, the voice recognition result from the server.

3. The display apparatus as claimed in claim 1, wherein the processor is further configured to:
   control the display to display the at least two icons based on information about positions of the at least two objects.

4. The display apparatus as claimed in claim 1, wherein the voice input is a first voice input, the voice signal is a first voice signal, the voice recognition result is a first voice recognition result, the text is a first text, and the single object is a first single object, and
   wherein the processor is further configured to:
   receive a second voice signal corresponding to a second voice input received using the microphone of the display apparatus or the external apparatus,
   process the second voice signal to obtain a second voice recognition result comprising a second text, and
   based on the second text corresponding to a second single object among the at least two objects, perform an operation related to the second single object.

5. The display apparatus as claimed in claim 1, wherein the number is expressed by a word of a basic language used for voice recognition.

6. The display apparatus as claimed in claim 1, wherein the single object and the at least two objects are selectable based on the voice signal, and
   wherein each of the single object and the at least two objects comprises a text object in a preset language.

7. The display apparatus as claimed in claim 1, wherein the processor is further configured to:
   control the display to display, along with the at least two icons, a phrase instructing a user to provide an additional voice input comprising the number.

8. The display apparatus as claimed in claim 1, wherein the processor is further configured to:
based on determining that the plurality of objects do not correspond to the voice recognition result, control the display to display a search result based on the text included in the voice recognition result.

9. A method of controlling a display apparatus, the method comprising:
displaying a first screen including a plurality of objects,
receiving a voice signal corresponding to a voice input received using a microphone of the display apparatus or an external apparatus,
processing the voice signal to obtain a voice recognition result comprising a text,
determining that the text is included in the displayed plurality of objects,
based on determining that the text is included in a single object among the displayed plurality of objects, performing an operation related to the single object, and
based on determining that the text is commonly included in at least two objects among the displayed plurality of objects, displaying a modified first screen which additionally includes at least two icons,
wherein each icon of the at least two icons represents a number, and is displayed adjacent to a corresponding object from among the at least two objects.

10. The display apparatus as claimed in claim 9, further comprising:
transmitting the voice signal to a server, and
receiving the voice recognition result from the server.

11. The display apparatus as claimed in claim 9, further comprising:
displaying the at least two icons based on information about positions of the at least two objects.

12. The display apparatus as claimed in claim 9, wherein the voice input is a first voice input, the voice signal is a first voice signal, the voice recognition result is a first voice recognition result, the text is a first text, and the single object is a first single object, and
wherein the method further comprises:
receiving a second voice signal corresponding to a second voice input received using the microphone of the display apparatus or the external apparatus,
processing the second voice signal to obtain a second voice recognition result comprising a second text, and
based on the second text corresponding to a second single object among the at least two objects, performing an operation related to the second single object.

13. The display apparatus as claimed in claim 9, wherein the number is expressed by a word of a basic language used for voice recognition.

14. The display apparatus as claimed in claim 9, wherein the single object and the at least two objects are selectable based on the voice signal, and
wherein each of the single object and the at least two objects comprises a text object in a preset language.

15. The display apparatus as claimed in claim 9, further comprising:
displaying, along with the at least two icons, a phrase instructing a user to provide an additional voice input comprising the number.

16. The display apparatus as claimed in claim 9, further comprising:
based on determining that the plurality of objects do not correspond to the voice recognition result, displaying a search result based on the text included in the voice recognition result.

* * * * *